C. F. COX.
METHOD FOR GATHERING GLASS.
APPLICATION FILED SEPT. 19, 1912.
1,212,189.
Patented Jan. 16, 1917.
2 SHEETS—SHEET 2.
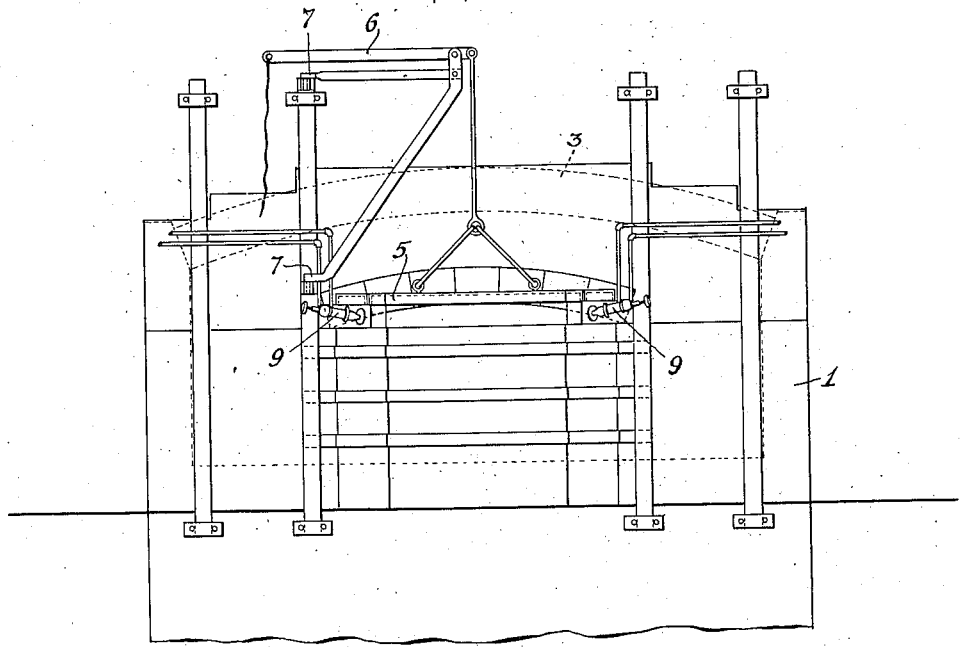
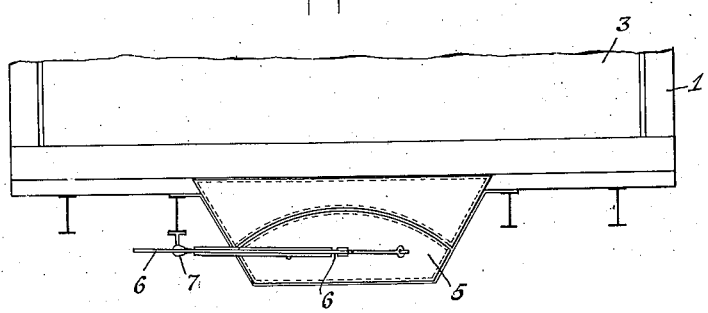
WITNESSES
INVENTOR
CHARLES F. COX
BY
ATTORNEYS

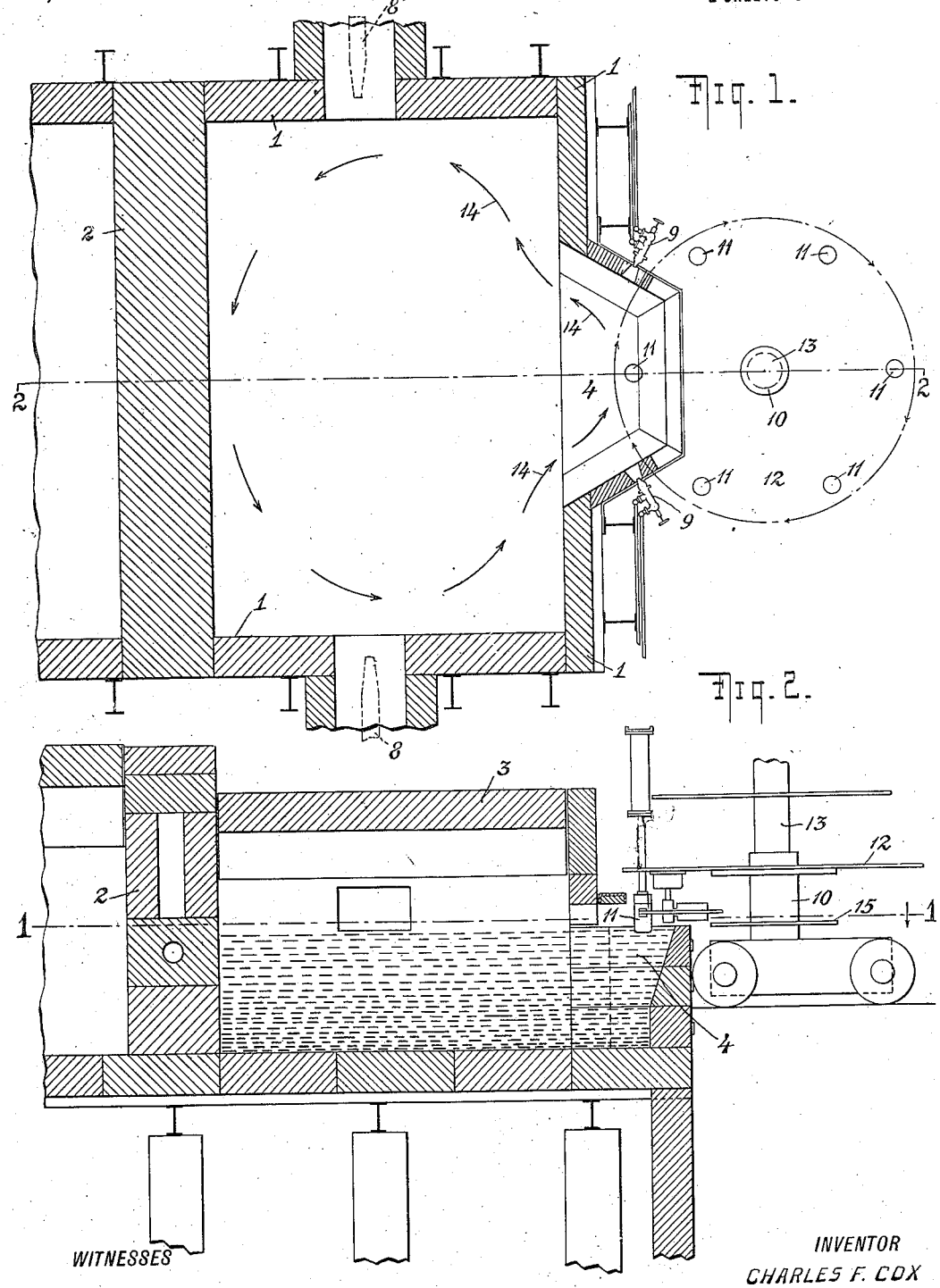

UNITED STATES PATENT OFFICE.

CHARLES F. COX, OF BRIDGETON, NEW JERSEY.

METHOD FOR GATHERING GLASS.

1,212,189.   Specification of Letters Patent.   Patented Jan. 16, 1917.

Application filed September 19, 1912. Serial No. 721,138.

*To all whom it may concern:*

Be it known that I, CHARLES F. COX, a citizen of the United States, and a resident of Bridgeton, county of Cumberland, and State of New Jersey, have invented certain new and useful Improvements in Methods of Gathering Glass, of which the following is a specification.

My invention relates to a method of gathering glass repeatedly from a fixed gathering point or points on the surface of a mass of molten glass and for removing from said gathering point or points, such portions of glass as are chilled by the gathering tool and causing them to be melted and merged with the general mass of glass.

More particularly, my invention relates to a method as aforesaid in which machines are used to draw glass into molds by suction.

My invention will be better understood by referring to the accompanying drawings which represent a preferred embodiment of apparatus for the practice of my improved method, and in which—

Figure 1 is a horizontal sectional view, taken along the line 1—1 of Fig. 2, of the glass furnace and the gathering machine used therewith; Fig. 2 is a sectional elevation of the same along the line 2—2 of Fig. 1, the gathering machine being in elevation; Fig. 3 is a front elevation of the furnace with gathering machine removed; and Fig. 4 is a plan view of the front end of the furnace.

The drawing of the gathering machine is diagrammatic only and intended to represent any usual rotary machine having a plurality of gathering devices of the general type shown in my Patent No. 880,482 of February 25, 1908, with such modifications as will later be pointed out.

In the drawings the furnace 1, suitably supported, is provided with the usual bridge wall 2 and a cover 3, all of refractory material as is usual in the art. At the center front of the furnace is a contracted extension 4 provided with a removable cover 5. This cover is hung from a lever 6 itself pivoted upon a swinging structure rotatable about the axis 7; the cover may thus readily be raised and swung out of the way when desired. Main gas burners 8 are or may be disposed in the usual way above the body of glass to melt the same and auxiliary burners 9 at the sides of the extension 4 are also desirable to act directly upon the glass within such extension.

The gathering machine 10, diagrammatically shown in Figs. 1 and 2, comprises a system of similar suction devices or molds 11 carried by a table or other suitable supporting structure 12 which is capable of being revolved about a central axis. As previously stated, gathering devices of this type are shown in my Patent No. 880,482 of February 25, 1908.

The gathering machine 10 is so arranged that, as each mold passes the first side wall of the extension 4 and over the molten glass in said extension, said mold is lowered into and remains below the surface of the glass and suction is applied to draw the glass into the mold while the mold continues its onward movement. Before the mold reaches the other side wall of extension 4 it is raised so as to pass over the same. The mold may or may not be brought to a stop as it thus passes over the extension. If the mold is stopped as it passes over extension 4 suction may be applied then instead of while the mold is in motion if preferred.

The operation of the apparatus in practising the method of my invention is as follows: the glass being in the furnace and in a suitable molten condition, and the gathering machine 10 being in position, (Figs. 1 and 2) the table 12 carrying the molds is caused to revolve. As each mold passes over the extension 4 it is lowered below the surface of the glass in said pool, is filled by suction, and then withdrawn. My present invention is not concerned with the further treatment of the mold content and for this the prior art may be consulted. Referring to the molten glass in the furnace proper and in the extension 4 the dipping of the successive molds beneath the surface of said glass and the unidirectional movement of said molds while so dipped will set up a circulatory current in said glass as indicated by the arrows 14. Immediately adjacent to the path of the mold this current will have a very noticeable velocity but as the distance from the mold becomes greater the velocity will, of course, decrease so that in the furnace proper it may hardly be perceptible especially if the furnace is of considerable size. The result of this circulatory movement of the glass is that a fresh supply of molten glass is constantly passing into the extension 4 at one side thereof while, at the other side, the glass which has been chilled by contact with the mold, is passing out into the furnace proper there to merge into the main body of glass and to be again brought into its original molten condition. The surplus glass also, ordinarily cut off from the gathering mold after it has been withdrawn from the molten glass, will fall back into the body of glass and float off away from the gathering point into the furnace proper.

Instead of having the molds move forward after they are dipped below the glass surface, thus producing the desired circulation, I may, if I prefer, employ other means for establishing said circulation. Such other means may be entirely independent of the gathering machine or it may be attached to or actuated by said machine. One form of such alternative construction might be, for example, an arrangement of horizontal drags attached to the lower plate 15 of the gathering machine and projecting radially therefrom midway between the molds. By means of a suitable cam below said plate and coöperating with the drags, each drag, as it reaches extension 4, would be lowered into the contained pool, be moved forward in said glass and be lifted from said glass as it reaches the other wall of the extension. Other ways of establishing the desired circulation will suggest themselves.

I have described my invention as applied to a furnace having but one extension 4, but my invention is not dependent upon the number of such extensions, and a furnace having any desired number of said extensions may be used, or such extensions may be omitted altogether.

Any furnace which is so constructed as to permit the circulation away from the gathering point to a region of sufficiently higher temperature, and from such region to the gathering point, and the application of a gathering tool to set up such circulation, may be used in carrying out my process, and in my claims I have designated such a furnace as a suitable furnace.

When the invention is applied to a furnace having a plurality of extensions, the several gathering machines may be driven separately from a common source of power or in any other convenient way. The same is true of the means by which the circulation of the glass is set up should such means be other than the molds themselves.

Having described my invention, I claim:

1. In the method of gathering glass which includes removing chilled glass from the gathering point and bringing a fresh supply of molten glass to such point, that improvement which comprises creating a circulation of glass away from such gathering point to a region of higher temperature, and back again to such gathering point by confining the glass in a suitable furnace and moving a gathering tool horizontally through said glass, substantially as and for the purpose described.

2. In the method of gathering glass which includes removing chilled glass from the gathering point and bringing a fresh supply of molten glass to such point, that improvement which comprises creating a circulation of glass away from such gathering point to a region of higher temperature, and back again to such gathering point by confining the glass in a suitable furnace and moving a gathering tool horizontally and uni-directionally through said glass, substantially as and for the purpose described.

In testimony whereof I have hereunto set my hand in the presence of two subscribing witnesses.

CHARLES F. COX.

Witnesses:
 LILLIAN S. BELL,
 WALTER H. BACON, Jr.